(12) United States Patent
Sprenger et al.

(10) Patent No.: US 6,569,330 B1
(45) Date of Patent: May 27, 2003

(54) FILTER COALESCER CARTRIDGE

(75) Inventors: Gregory S. Sprenger, Colorado Springs, CO (US); Michael J. Gish, Colorado Springs, CO (US)

(73) Assignee: Velcon Filters, Inc., Colorado Springs, CO (US)

( * ) Notice: Subject to any disclaimer, the term of this patent is extended or adjusted under 35 U.S.C. 154(b) by 0 days.

(21) Appl. No.: 09/620,201

(22) Filed: Jul. 19, 2000

(51) Int. Cl.$^7$ .................. B01D 27/08; B01D 27/14
(52) U.S. Cl. .............. 210/315; 210/323.2; 210/337; 210/489; 210/493.1; 210/497.01; 210/499; 210/505; 210/508; 210/DIG. 5
(58) Field of Search ............ 210/493.1, 483, 210/493.2, 485, 493.4, 484, 493.5, 497.01, 502.26, 488–490, 315, DIG. 5, 342, 335, 504, 505, 508, 509, 314, 487, 323.2, 337

(56) References Cited

U.S. PATENT DOCUMENTS

| 2,864,505 A | * | 12/1958 | Kasten |
| 2,911,101 A | * | 11/1959 | Robinson |
| 3,115,459 A | * | 12/1963 | Giesse |
| 3,187,895 A | * | 6/1965 | Pall et al. .................. 210/114 |
| 3,209,916 A | * | 10/1965 | May et al. |
| 3,228,527 A | * | 1/1966 | McPherson ................. 210/307 |
| 3,390,780 A | * | 7/1968 | Bennett |
| 3,397,793 A | * | 8/1968 | MacDonnell |
| 3,827,566 A | * | 8/1974 | Ponce ......................... 210/338 |
| 4,052,316 A | * | 10/1977 | Berger, Jr. et al. .......... 210/315 |
| 4,089,783 A | * | 5/1978 | Holyoak ..................... 210/358 |
| 4,406,787 A | * | 9/1983 | Suto et al. .................. 210/315 |
| 4,519,819 A | * | 5/1985 | Frantz ......................... 96/115 |
| 4,604,205 A | * | 8/1986 | Ayers ....................... 210/497.2 |
| 4,618,388 A | * | 10/1986 | Ayers |
| 4,692,175 A | * | 9/1987 | Frantz |
| 4,878,929 A | * | 11/1989 | Tofsland et al. |
| 4,995,974 A | * | 2/1991 | Lorey et al. ................ 210/247 |
| 5,232,595 A | * | 8/1993 | Meyer ...................... 210/493.1 |
| 5,565,094 A | * | 10/1996 | Zoch et al. ................... 210/86 |
| 5,800,586 A | * | 9/1998 | Cusick et al. |
| 5,980,759 A | * | 11/1999 | Proulx et al. ............... 210/767 |

FOREIGN PATENT DOCUMENTS

GB     1392936     *  5/1975

* cited by examiner

*Primary Examiner*—W. L. Walker
*Assistant Examiner*—Marianne Ocampo
(74) *Attorney, Agent, or Firm*—Donald R. Fraser

(57) ABSTRACT

A filter coalescer cartridge for treating jet fuels comprising spaced apart filter/coalescer layers to effectively remove particulate contaminants and water from the transient fuel being treated.

10 Claims, 2 Drawing Sheets

FILTER COALESCER CARTRIDGE

FIELD OF THE INVENTION

The present invention relates to filter coalescer cartridges, and more particularly to filter coalescer cartridges which perform well in the presence of surfactant-type additives in jet fuel.

BACKGROUND OF THE INVENTION

Recently, new kerosene-based fuel has been developed for use in jet aircraft. The fuel is similar to previous jet fuels and contains an additional additive to improve the thermal stability of the fuel. Thermal stability of fuel used in fighter aircraft is critical and places increased heat transfer requirements on the fuel.

The additive has surfactant/detergency properties, which clean engine components as the fuel flows through the aircraft and engine fuel system. The additive functions in a manner similar to additives presently added to motor gasoline to clean fuel injectors.

Water removal from jet fuel is a critical requirement of any refueling filtration equipment. However, the presence of the new additive causes the removal of water from the fuel to be more difficult. Any water present in the fuel becomes more thoroughly emulsified as it is pumped through the ground fuel handling equipment. The emulsion is also more stable, resisting the removal of water with the conventional coalescence and settling process.

State of the art filter coalescer elements typically contain two major media sections: pleated media to primarily capture solid contaminant, and a surrounding cylinder of media to primarily coalesce the water to aid settling. The pleated media is usually wet-laid fiberglass papers, supported by either cellulose paper or synthetic media having adequate structure.

The pleated media also contributes to improve the coalescence of the water emulsion. The pleated media provides a critical aid to coalescence. The lower face velocity through the higher surface area of the pleated media is necessary to adequately coalesce water emulsions from the fuel. The pleated media is also functional to capture solid particulate contaminants. However, it has been found that such filter coalescer elements do not meet the new testing requirements.

Testing has shown that one media cannot adequately perform both functions. The upstream layer functions mainly to capture solid particles, but also starts the coalescing process. Due to more stringent particle capacity requirements in new test specifications, the first layer must have very high particle loading capacity (high solids/area of media).

The latest military fuel, JP8+100, contains additives which have strong surfactant and electrical properties. The current filter coalescer cartridges cannot adequately coalesce and separate water emulsions from the new fuel due to the emulsion stabilizing effect of the additives.

SUMMARY OF THE INVENTION

It is an object of the present invention to produce a new and improved filter coalescer element which exhibits good water coalescence and water separation.

Another object of the invention is to produce an improved filter coalescer element capable of effective water coalescence and water separation from hydrocarbon fluids and provide for increased solid particulate contaminant holding capacity.

The above, as well as other objects of the invention are typically achieved by a filter coalescer element for coalescing water emulsions in transient hydrocarbon fluids such as jet aircraft fuel and prevent the flow of particulate contaminants consisting of a) a first layer of pleated filter media formed in an annular array of individual pleats to commence the water coalescence in the transient jet fuel and to remove particulate contaminants therefrom;

b) a second layer of pleated filter media formed in an annular array of individual pleats surrounding the first layer to coalesce the water in the transient fuel and to remove particulate contaminants therefrom;

c) a screen support layer surrounding the second layer of pleated filter media.

BRIEF DESCRIPTION OF THE DRAWINGS

The above objects and advantages of the invention will become clearly manifest to those skilled in the act from reading the following detailed description of several embodiments of the invention when considered in the light of the accompanying drawings, in which.

DETAILED DESCRIPTION OF THE PREFERRED EMBODIMENTS OF THE INVENTION

Figure 1:
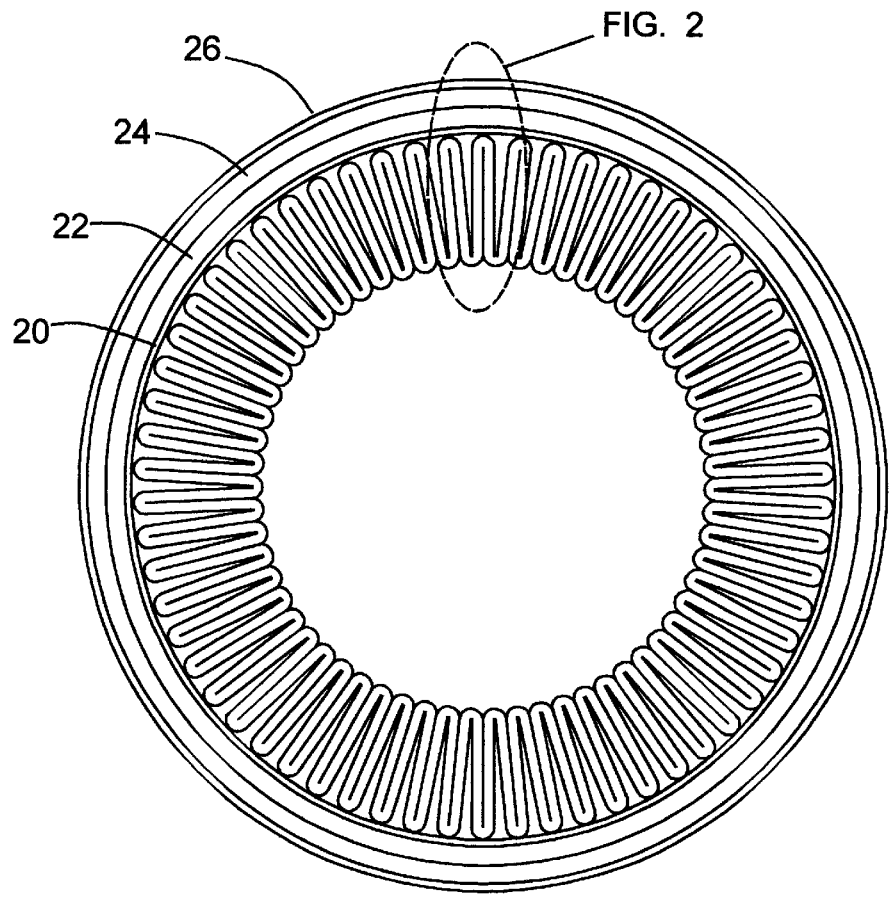
FIG. 1 is a cross-sectional view of a filter coalescer cartridge containing the features of the present invention.
Figure 2:
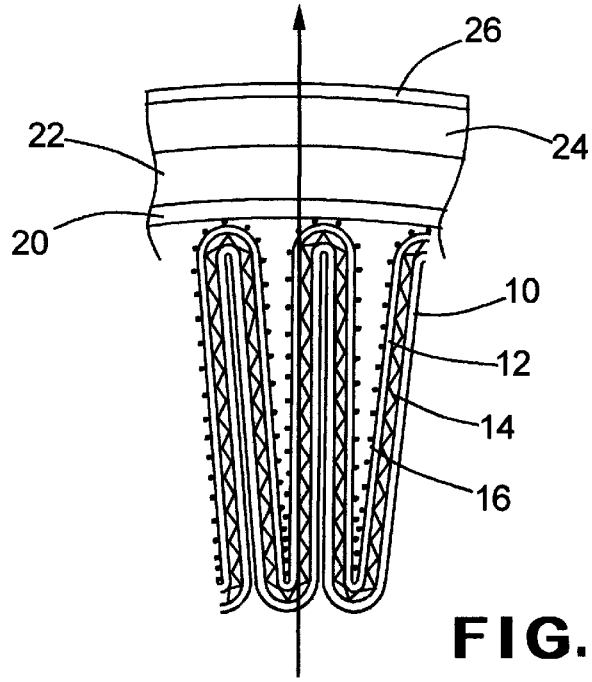
FIG. 2 is an enlarged fragmentary view of a portion of the cartridge illustrated in FIG. 1.

Referring to FIGS. 1 and 2 there is illustrated a filter coalescer cartridge design to treat hydrocarbon fluids such as, for example, JP8+100. JP8+100 jet fuel contains an additive to improve the thermal stability of the fuel designated as 8Q462 additive commercially available from Betz Dearborn Company, 9669 Grogans Mill Road, The Woodlands, Tex. 77387-4300. It has been found that the additive has strong surfactant and electrical properties which apparently renders existing filter coalescer cartridges unable to adequately coalesce and separate water emulsions from the attendant fuel. Surprisingly, the filter coalescer cartridge embodying the features of the present invention exhibits good water coalescence and water separation, as well as solid contaminant holding capacity in treating fuels with the thermal stabilizing surfactant-type additives such as mentioned above.

The filter coalescer cartridge illustrated in FIGS. 1 and 2 includes a pleat block containing a first layer 10 of pleated filter media having oppositely disposed facing surfaces. The pleated filter layer 10 is formed in an annular arrangement wherein the individual pleats are parallel with one another.

A second layer 12 of pleated filter media having oppositely disposed facing surfaces in disposed in spaced relation downstream from the outer facing surface of the first layer 10. The pleated filter media is formed in an annular arrangement wherein the individual pleats are parallel with one another and are spaced apart in the same fashion as the pleats of the first layer 10.

The pleats of the second layer 12 are spaced from pleats in the first layer 10 by a pleated spacer material 14. The spacer material 14 provides a void space between the first layer 10 and the second layer 12.

A final pleated layer 16 is provided as a support media. The pleated layer 16 is formed of a woven screen material to provide and maintain the desired pleated configuration and to assure consistence of the separation of the pleats formed in the first layer 10, the second layer 12 and the spacer net 14. It has been found that satisfactory functional results can be achieved by forming the spacer net 14 of a diamond net design spacer material supplied by Nalle Plastic of Austin, Tex. and commercially designated as Naltex 37-3821. (Further, it has been found that a mesh size in the range of 15–30 mesh (wires/inch) are preferable in pleated layer 16. Also, high open area (>40%) in the screen of the pleated layer 16 is preferable.) The net 14 provides a relatively void space between the first layer 10 and the second layer 12.

In the preferred embodiment of the invention, the first layer 10 of filter media was formed of a dual layer media which was constructed of two different fiber mixes incorporated into one thin unitary media. The first fiber mix contains slightly coarser fibers and the second or downstream fiber mix contains smaller diameter fibers. The first fiber mix containing the more coarse fibers is effective to capture the larger particulate contaminants in the transient fuel being treated, while the second downstream fiber mix contains smaller diameter fibers is effective to capture the smaller particulate contaminants in the transient fuel being treated. The fiber media is produced by Hollingsworth & Vose Company, East Walpole, Mass. and is commercially designated as DC-4271.

Functionally, it has been found that the first or upstream layer 10 functions to mainly capture solid particles, but the media also commences the coalescing process. The material of the layer 10 is a dual phase material providing high dirt holding capacity. It is composed of borosilicate glass fibers with an acrylic binder. The acrylic binder content is about 5% by weight. Due to the stringent particle capacity requirements of such filter coalescer cartridges, the first layer 10 must exhibit very high particle loading capacity (high solids/area of media).

It has been found that as the first layer 10 captures particles from the transient fuel, the coalescing function of the layer 10 may tend to decrease in efficiency. As the first layer 10 captures more and more particles, the pores in the media become plugged with captured particulates. The velocity of the fluid flow through the remaining open pores tends to increase. Such increase in the velocity of the fluid being treated results in less efficient coalescing. Additionally, the free water in the transient fluid causes the pressure drop across the first layer 10 to rise which, in turn, impairs the coalescence of the water.

The second layer 12 of filter media is effective to continue the water coalescence process as the fluid being treated passes through the cartridge. The second layer 12 is typically formed of the same filter media as the first layer 10.

The completed filter coalescer of the embodiment illustrated in FIGS. 1 and 2 includes a perforated metal tube 20 which surrounds the pleated assembly of the first layer 10, the spacer layer 14, the second layer 12, and support layer 16. The tube 20 is typically formed of aluminum, approximately 5¼" ID, with approximately forty (40%) percent open area.

In order to obtain maximum burst strength, it has been found that the openings or perforations in the tube 20 are formed by stamping or otherwise producing louvered-like openings. The outermost surfaces of the radially outer pleats of the support layer 16 are positioned to be in intimate contact with the inner surface of the tube 20.

Next, a layer 22 of fiberglass material is wrapped about the outer surface of the perforated tube 20. The layer 22 is comprised of fiberglass wraps consisting of two media both obtained from Johns-Manville Corporation, Denver, Colo. One of the wraps is a 5 HT blanket (approximately one micron diameter glass fiber), ⅜ inch thick, 0.018 lbs/sq.ft., with phenolic binder, vendor P/N LFU4-⅜; the other of the wraps is a 22 HT blanket (approximately four and one half micron diameter glass fiber), ¾ inch thick, 0.039 lbs/sq.ft. with phenolic binder, vendor P/N LFU22-¾.

A layer 24 is formed about the outer surface of the fiberglass layer 22. The layer 24 is typically comprised of polyester fibers with a binder. The layer 24 is typically approximately ¼" thick, and weighs 0.44 ounces per square foot. The material is commercially available under the trademark Hiloft from Hobbs Bonded Fibers, vendor P/N 63H515.

The entire cartridge assembly is disposed within an outer layer 26 formed of a knit material. The outer layer 26 may be formed of a cotton sock material 15 inches wide when fully stretched. A satisfactory material typically may have the following properties: 20 wales/inch, 20 courses/inch, and 12.5 yds/lb. The material is available commercially from Murray Fabrics, Tennessee, vendor P/N 14140.

Figure 3:
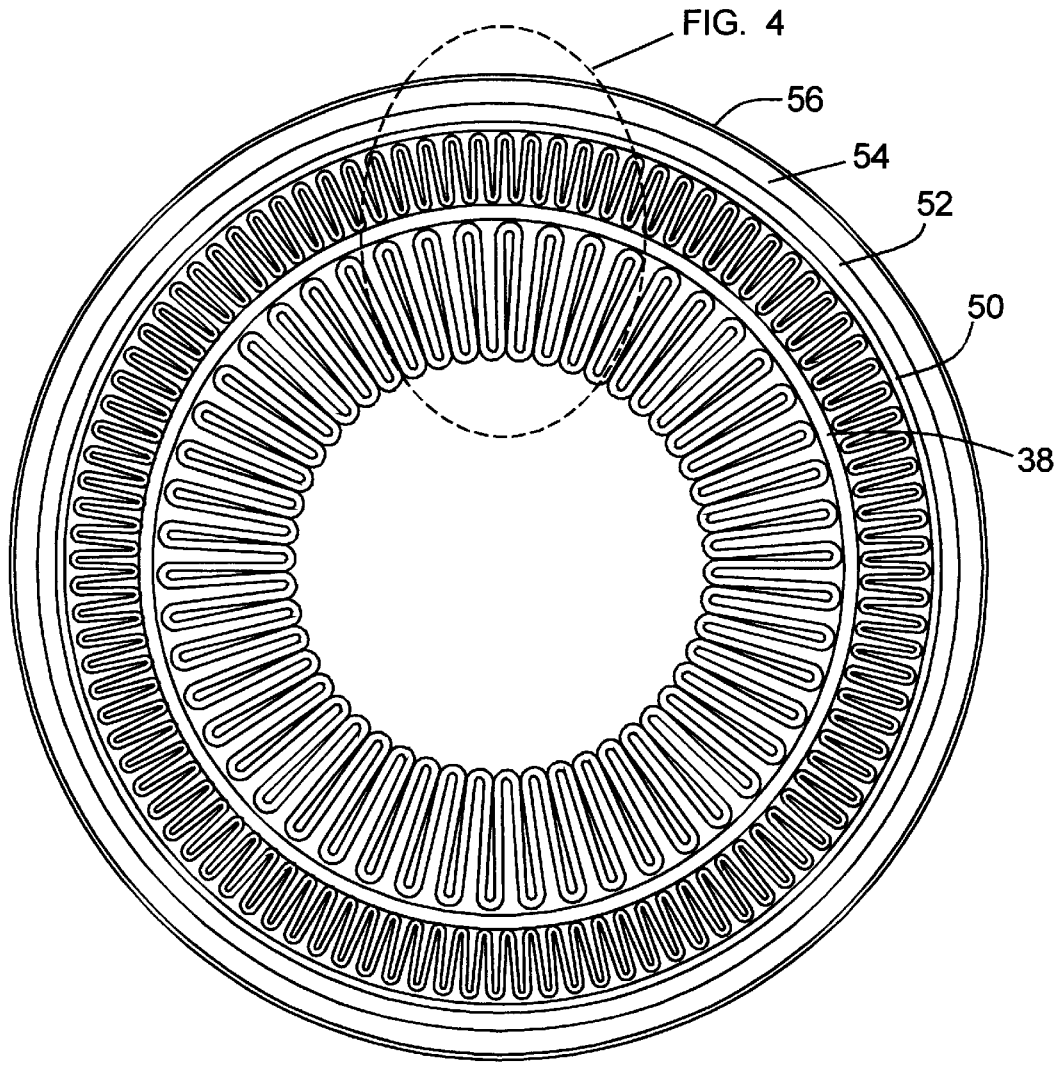
FIG. 3 is a cross-sectional view of a modified form of the filter coalescer cartridge illustrated in FIGS. 1 and 2.
Figure 4:
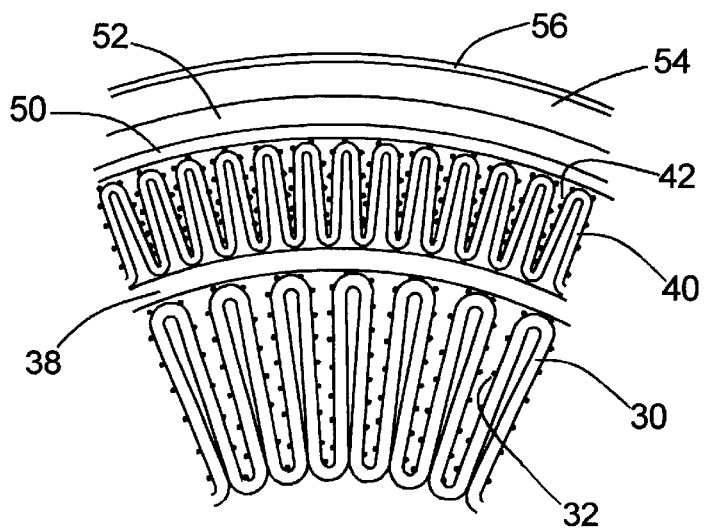
FIG. 4 is an enlarged fragmentary view of a portion of the cartridge illustrated in FIG. 3.

An alternative filter coalescer structure is illustrated in FIGS. 3 and 4. The illustrated embodiment basically induces two separate pleat blocks which can be successfully used to obtain the spacing, which was provided by the layer of spacer material in the embodiment of FIGS. 1 and 2. The embodiment illustrated in FIGS. 1 and 2, as well as the filter coalescer of FIGS. 3 and 4, is designed for an inside-out flow of the fluid being treated.

The filter coalescer structure of FIGS. 3 and 4 includes an inside or first pleat block which is comprised of a layer 30 of pleated filter media having oppositely disposed facing surfaces. The pleated filter layer 30 is comprised of a dual layer media constructed of two different fiber mixes incorporated into one thin unitary media and is formed in an annular arrangement wherein the individual pleats are parallel with one another. A woven mesh support media 32 is disposed in pleated relation on the outer facing surface of the filter layer 30. Satisfactory results have been obtained by utilizing a filter media produced by Hollingsworth & Vose Company, East Walpole, Mass. and commercially available as DC-4271.

An outside or second pleat block contains a layer 40 of pleated filter media having opposing disposed facing surfaces. The pleated fiber layer 40 is comprised of a dual layer media constructed of two different fiber mixes incorporated into one thin unitary media and is formed in an annular arrangement wherein the individual pleats are parallel with one another. The material is available from the same source as the layer 30. A woven mesh support media 42 is disposed in pleated relation on the outer facing surface of the filter layer 40.

A thin metal perforated tube 38, similar in construction to the tube 20 of the embodiment of FIGS. 1 and 2, is interposed between the outermost surfaces of the pleats of the filter layer support media 32 and the innermost surface of the pleats of the filter layer 40 of the pleat block. The perforated tube 38 provides additional burst strength to the first pleat block assembly.

The completed filter coalescer of the embodiment illustrated in FIGS. 3 and 4 includes a second perforated metal tube 50, similar in construction to the tube 38, which surrounds the pleated assembly of the second pleat block. The outermost surfaces of the radially outer pleats of the support layer 42 are in intimate contact with the inner surface of the tube 50.

Next, a layer 52 of fiberglass material is wrapped about the outer surface of the perforated tube 50. The layer 52 is comprised of a two media material which is the same as used for forming the layer 22 of the embodiment of FIGS. 1 and 2.

A layer 54 of material is formed about the outer surface of the fiberglass layer 52. The layer 54 is typically comprised of polyester fibers which is the same material used for forming the layer 24 of the embodiment of FIGS. 1 and 2.

The entire cartridge assembly is disposed within an outer layer 56 formed of a knit material which may be the same as used in forming the layer 26 of the embodiment of FIGS. 1 and 2.

Due to the extra space needed for the final layer 42 of support media compared with the embodiment illustrated in FIGS. 1 and 2, less filter media can be used in the design. To compensate for the reduced filter media, the heights of the pleat blocks can be different. By increasing the length of the pleats of the first or inner pleat block allows more surface area in the inner pleat block for the capture of solid particulate contaminants. Such design parameters result in an increase in the capacity to capture solid particulates. However, this causes a decrease in the overall inner diameter of the filter cartridge.

An advantage of the embodiment of FIGS. 3 and 4 resides in the fact that any pressure build-up generated by the capture of particles in the first pleat block does not cause compression of the second pleat block. Thereby, the effective coalescence of the second pleat block is independent of the pressure build-up of the first pleat block.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A filter coalescer cartridge for treating jet fuel including:
   a first layer of pleated fiberglass filter media having oppositely disposed facing surfaces formed in an annular array of individual parallel spaced apart pleats to commence water coalescence in the fuel being treated and to remove particulate contaminants therefrom;
   a second layer of pleated fiberglass filter media having oppositely disposed facing surfaces formed in an annular array of individual parallel spaced apart pleats to coalesce water in the fuel being treated and to remove particulate contaminants therefrom, said second layer of pleated filter media surrounding said first layer of filter media to form a nested pleated structure with said second layer of filter media such that outer facing peaks of the first layer of media fit within inner valleys of the second layer of media and inner facing peaks of the second media fit within outer valleys of the first layer of media;
   a screen support layer surrounding the outer surface of said second layer of pleated filter media; and
   an intermediate spacer layer disposed between said first and said second layers of pleated filter media, said spacer layer abutting an entire inner facing surface of the second layer of pleated filter media adjacent the one of the facing surfaces of said first layer of pleated filter media, and an outer facing surface of said first layer of pleated filter media.

2. The filter coalescer cartridge according to claim 1 wherein said first layer and said second layer of filter media are formed of glass fibers of at least two different fiber diameter mixes.

3. The filter coalescer cartridge according to claim 2 wherein one of the fiber diameter mixes is comprised of fibers of one diameter and the fiber diameter of the other of the fiber diameter mixes contains fibers of a greater diameter.

4. The filter coalescer cartridge according to claim 2 including outer fiber wraps surrounding said screen support layer.

5. The filter coalescer cartridge according to claim 4 including an outer knitted sock material surrounding at least said outer fiber wraps.

6. The filter coalescer cartridge according to claim 1 wherein the intermediate spacer layer comprises a spacer net material.

7. The filter coalescer cartridge according to claim 6 including a perforated tube surrounding the assembly of said first layer, said second layer, said intermediate layer and said support layer.

8. The filter coalescer cartridge according to claim 6 wherein said layer of spacer net material effectively spaces the individual pleats of said first layer from said second layer of filter media.

9. The filter coalescer cartridge according to claim 1 wherein said first layer and said second layer of filter media are formed of glass fibers.

10. A process for forming a filter coalescer for treating jet fuel comprising:
    forming a first layer of pleated fiberglass filter media having oppositely disposed facing surfaces formed in an annular array of individual parallel spaced apart pleats to commence water coalescence in the fuel being treated and to remove particulate contaminants therefrom;
    forming a second layer of pleated fiberglass filter media having oppositely disposed facing surfaces in spaced relation to said first layer and formed in an annular array of individual parallel spaced apart pleats to coalesce water in the fuel being treated and to remove particulate contaminants therefrom, said second layer of pleated filter media surrounding said first layer of filter media to form a nested pleated structure with said second layer of filter media such that the outer facing peaks of the first layer of media fit within inner valleys of the second layer of media and inner facing peaks of the second media fit within outer valleys of the first layer of media;
    forming a screen support layer surrounding the outer surface of said second layer of pleated filter media; and
    forming an intermediate spacer layer disposed between said first and said second layers of pleated filter media, said spacer layer abutting an entire inner facing surface of the second layer of pleated filter media adjacent the one of the facing surfaces of said first layer of pleated filter media, and an outer facing surface of said first layer of pleated filter media.

* * * * *